(12) United States Patent
Mayhew et al.

(10) Patent No.: US 12,188,530 B1
(45) Date of Patent: Jan. 7, 2025

(54) HYDRAULIC MOTION DETECTION VIA SOLENOID ELECTRONIC FEEDBACK

(71) Applicant: FCA US LLC, Auburn Hills, MI (US)

(72) Inventors: William R Mayhew, Ann Arbor, MI (US); Steven B Christ, Ann Arbor, MI (US); Niranjan Das, Ann Arbor, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/485,720

(22) Filed: Oct. 12, 2023

(51) Int. Cl.
*F16D 48/06* (2006.01)
*F16H 61/02* (2006.01)

(52) U.S. Cl.
CPC ....... *F16D 48/066* (2013.01); *F16H 61/0251* (2013.01); *F16D 2500/3028* (2013.01); *F16D 2500/5012* (2013.01); *F16D 2500/7041* (2013.01); *F16D 2500/7109* (2013.01); *F16H 2061/0255* (2013.01)

(58) Field of Classification Search
CPC ........... F16D 48/066; F16D 2500/1027; F16D 2500/3028; F16D 2500/3022; F16D 2500/3024; F16D 2500/5012; F16D 2500/70217; F16D 2500/70223; F16D 2500/70229; F16D 2500/7109; F16H 61/0251; F16H 2061/0255
See application file for complete search history.

(56) References Cited

U.S. PATENT DOCUMENTS

| | | | | |
|---|---|---|---|---|
| 5,424,637 | A * | 6/1995 | Oudyn | H01F 7/1844 324/207.16 |
| 5,481,187 | A * | 1/1996 | Marcott | H01F 7/1844 324/207.16 |
| 10,464,409 | B2 | 11/2019 | Ornella et al. | |
| 11,242,039 | B2 | 2/2022 | Takaki | |
| 2007/0126283 | A1 | 6/2007 | Thoms | |
| 2008/0082242 | A1* | 4/2008 | Dell'Eva | F16H 61/0251 477/34 |
| 2023/0278785 | A1 | 9/2023 | Maroney et al. | |

FOREIGN PATENT DOCUMENTS

| | | |
|---|---|---|
| DE | 20220741 U1 | 4/2004 |
| DE | 102016204872 A1 | 9/2017 |
| DE | 102005063691 | 3/2021 |
| JP | 2007297998 A | 11/2007 |
| JP | 5260227 B2 | 8/2013 |

\* cited by examiner

*Primary Examiner* — Timothy Hannon
(74) *Attorney, Agent, or Firm* — Jeremy J. Klobucar

(57) ABSTRACT

A hydraulic piston position determination system for a vehicle includes a hydraulic piston actuator configured to move a piston member in response to a hydraulic fluid pressure to engage/disengage a friction member, a hydraulic solenoid valve configured to control the hydraulic fluid pressure at the hydraulic piston actuator by regulating a flow of hydraulic fluid from a hydraulic fluid supply system, and a controller configured to control the hydraulic piston actuator by controlling the hydraulic solenoid valve according to an actual duty cycle based on a flow demand change associated with the hydraulic piston actuator, and determine a position of the hydraulic piston actuator based on (i) a magnetic reluctance change and (ii) a difference between the actual duty cycle and a steady-state duty cycle for the hydraulic solenoid valve.

16 Claims, 4 Drawing Sheets

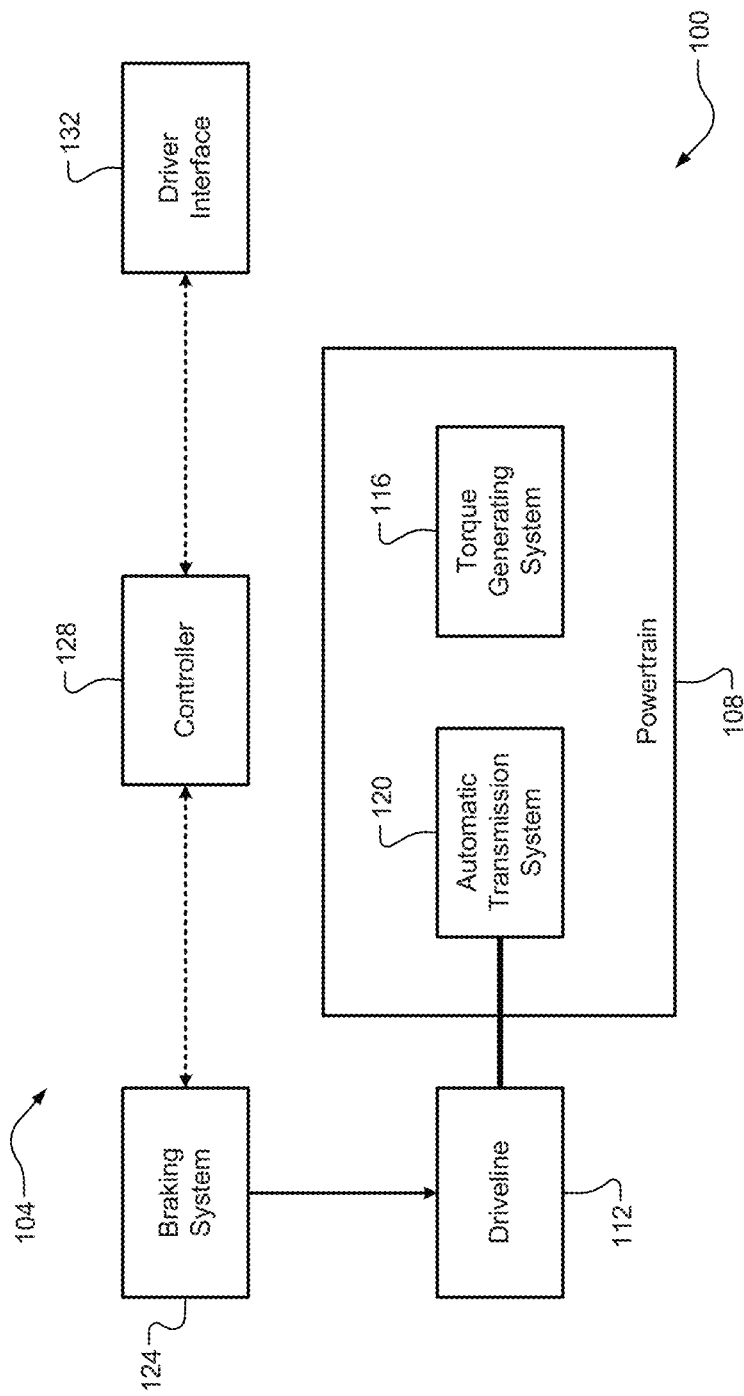

HYDRAULIC MOTION DETECTION VIA SOLENOID ELECTRONIC FEEDBACK

FIELD

The present application generally relates to hydraulically controlled vehicle systems and, more particularly, to techniques for hydraulic motion detection via solenoid electronic feedback.

BACKGROUND

Vehicles often include one or more hydraulically controlled systems where the flow of hydraulic fluid (e.g., oil) is controlled by electronic solenoids (e.g., valves). Two primary examples of hydraulically controlled vehicle systems are a hydraulic braking system and an automatic transmission system. In an automatic transmission system, hydraulic fluid flow is controlled to actuate one or more clutch pistons to achieve a desired gear ratio for transferring drive torque to a driveline for vehicle propulsion. The position of the clutch pistons is particularly of interest, and is required for safety-critical functional tests, diagnostics, and self-learning algorithms. Conventional clutch position determination techniques, however, are only able to determine the clutch position after an intrusive (i.e., not driver-requested) clutch action, such as a small but non-negligible torque change. Accordingly, while such conventional automatic transmission control systems do work well for their intended purpose, there exists an opportunity for improvement in the relevant art.

SUMMARY

According to one example aspect of the invention, a hydraulic piston position determination system for a vehicle is presented. In one exemplary implementation, the hydraulic piston position determination system comprises a hydraulic piston actuator configured to move a piston member in response to a hydraulic fluid pressure to engage/disengage a friction member of the vehicle, a hydraulic solenoid valve configured to control the hydraulic fluid pressure at the hydraulic piston actuator by regulating a flow of hydraulic fluid from a hydraulic fluid supply system, and a controller configured to control the hydraulic piston actuator by controlling the hydraulic solenoid valve according to an actual duty cycle based on a flow demand change associated with the hydraulic piston actuator, and determine a position of the hydraulic piston actuator based on (i) a magnetic reluctance change and (ii) a difference between the actual duty cycle and a steady-state duty cycle for the hydraulic solenoid valve.

In some implementations, the controller is configured to determine the position of the hydraulic piston actuator in a non-intrusive manner. In some implementations, the controller does not intrusively command a torque change at the vehicle and then determine the position of the hydraulic piston actuator based on a detected change in a rotational speed of a component of the vehicle. In some implementations, the controller is further configured to determine a current demand for the hydraulic solenoid valve based on the flow demand change associated with the hydraulic piston actuator, determine the steady-state duty cycle for the hydraulic solenoid valve based on the determined current demand, determine the actual duty cycle for the hydraulic solenoid valve that maintains the current demand during motion of the hydraulic solenoid valve, and determine the position of the hydraulic piston actuator based on the actual duty cycle a set of known parameters when the difference between the actual and steady-state duty cycles for the hydraulic solenoid valve exceeds an excursion threshold.

In some implementations, the set of known parameters include, for the hydraulic solenoid valve, voltage, electromagnetic inductance, electromagnetic coil quantity, and air gap geometry, and wherein changes in the air gap geometry affect the magnetic reluctance. In some implementations, the controller is configured to use a predetermined lookup table relating various steady-state duty cycles and current demands to determine the steady-state duty cycle for the hydraulic solenoid valve based on the determined current demand. In some implementations, the friction member is a clutch member of an automatic transmission system of the vehicle. In some implementations, the friction member is a clutch member of a hydraulic braking system of the vehicle.

According to another example aspect of the invention, a hydraulic piston position determination method for a vehicle is presented. In one exemplary implementation, the method comprises providing a hydraulic piston actuator configured to move a piston member in response to a hydraulic fluid pressure to engage/disengage a friction member of the vehicle, providing a hydraulic solenoid valve configured to control the hydraulic fluid pressure at the hydraulic piston actuator by regulating a flow of hydraulic fluid from a hydraulic fluid supply system, controlling, by a controller, the hydraulic piston actuator by controlling the hydraulic solenoid valve according to an actual duty cycle based on a flow demand change associated with the hydraulic piston actuator, and determining, by the controller, a position of the hydraulic piston actuator based on (i) a magnetic reluctance change and (ii) a difference between the actual duty cycle and a steady-state duty cycle for the hydraulic solenoid valve.

In some implementations, the determining of the position of the hydraulic piston actuator is performed in a non-intrusive manner. In some implementations, the controller does not intrusively command a torque change at the vehicle and then determine the position of the hydraulic piston actuator based on a detected change in a rotational speed of a component of the vehicle. In some implementations, the method further comprises determining, by the controller, a current demand for the hydraulic solenoid valve based on the flow demand change associated with the hydraulic piston actuator, determining, by the controller, the steady-state duty cycle for the hydraulic solenoid valve based on the determined current demand, determining, by the controller, the actual duty cycle for the hydraulic solenoid valve that maintains the current demand during motion of the hydraulic solenoid valve, and determining, by the controller, the position of the hydraulic piston actuator based on the actual duty cycle a set of known parameters when the difference between the actual and steady-state duty cycles for the hydraulic solenoid valve exceeds an excursion threshold.

In some implementations, the set of known parameters include, for the hydraulic solenoid valve, voltage, electromagnetic inductance, electromagnetic coil quantity, and air gap geometry, and wherein changes in the air gap geometry affect the magnetic reluctance. In some implementations, determining the steady-state duty cycle for the hydraulic solenoid valve based on the determined current command includes using a predetermined lookup table relating various steady-state duty cycles and current demands. In some implementations, the friction member is a clutch member of an automatic transmission system of the vehicle. In some implementations, the friction member is a clutch member of a hydraulic braking system of the vehicle.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

BRIEF DESCRIPTION OF THE DRAWINGS

FIG. 1 is a functional block diagram of a vehicle having an example hydraulic piston position determination system according to the principles of the present application;

DESCRIPTION

Figure 2A:
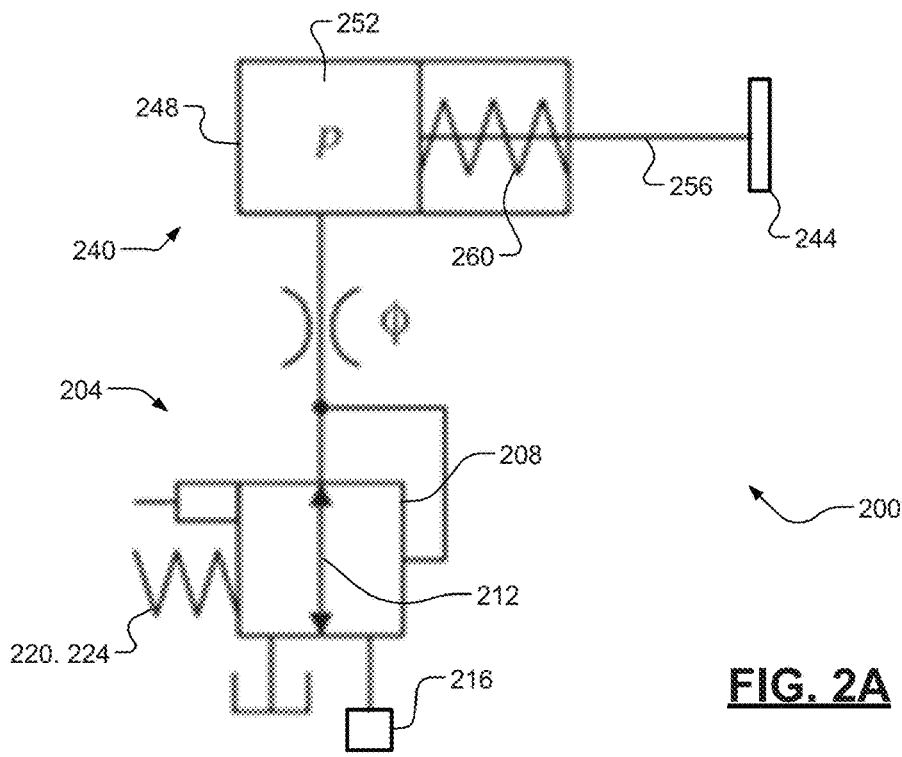
FIG. 2A is a schematic diagram of an example hydraulically controlled solenoid connected to a hydraulic piston actuator flow load according to the principles of the present application.

As previously discussed, in hydraulically controlled vehicle system such as an automatic transmission system, conventional clutch position determination techniques are only able to determine the hydraulic piston position after an intrusive (i.e., not driver-requested) clutch action, such as a small but non-negligible torque change. After this torque change, these conventional techniques determine hydraulic piston position based on changes (disturbances) in a monitored rotational speed of a vehicle component (e.g., a transmission output shaft speed). This intrusive maneuver could potentially be noticeable to a driver of the vehicle. Further, such intrusive maneuvers are limited to specific operation conditions or scenarios where it is safe to perform intrusive torque control action. Accordingly, non-intrusive hydraulic piston position determination systems and methods are presented herein.

These non-intrusive techniques control the hydraulic piston actuator by controlling the hydraulic solenoid valve according to an actual duty cycle based on a flow demand change associated with the hydraulic piston actuator and then determine a position of the hydraulic piston actuator based on (i) a magnetic reluctance change and (ii) a difference between the actual duty cycle and a steady-state duty cycle for the hydraulic solenoid valve. This magnetic reluctance change is substantial enough to be discernible during certain operating conditions where the flow load demand suddenly changes. More specifically, when the actual duty cycle for the hydraulic solenoid valve to maintain/track a desired current demand exceeds a predetermined steady-state duty cycle by more than an excursion threshold, the opportunity to convert hydraulic solenoid valve voltage to hydraulic piston position (via known relationships between parameters such as voltage, electromagnetic inductance, changes in air gap geometries, and the magnetic reluctance).

Referring now to FIG. 1, a functional block diagram of a vehicle 100 having an example hydraulic piston position determination system 104 according to the principles of the present application is illustrated. The vehicle 100 includes a powertrain 108 configured to generate and transfer torque to a driveline 112 for vehicle propulsion. The powertrain 108 includes a torque generating system 116 (an internal combustion engine, one or more electric motors, or combinations thereof) configured to generate torque and a transmission system 120 (e.g., a multi-speed automatic transmission and a torque converter) configured to transfer and the drive torque from the torque generating system 116 to the driveline 112. In one exemplary implementation, the automatic transmission system 120 includes a hydraulically actuated or controlled automatic transmission. The vehicle 100 also includes a braking system 124 configured to selectively provide friction braking force at the driveline 112 to slow/reduce a speed of the vehicle 100. In one exemplary implementation, the braking system 124 is a hydraulically actuated or controlled braking system.

A controller 128 is configured to control operation is the vehicle 100, including controlling the torque generating system 116 to generate an amount of torque to satisfy a driver torque request (e.g., from a driver interface 132), as well as the automatic transmission and braking systems 120, 124. In some implementations, the controller 128 and one of the automatic transmission system 120 and the braking system 124 collectively form the hydraulic piston determination system 104 according to the principles of the present application. More specifically, for hydraulically actuated or controlled implementations of these systems 120, 124, there could be at least one hydraulic piston actuator (not shown), such as for actuating a clutch (not shown) and a hydraulic solenoid valve (not shown), such as for controlling hydraulic fluid flow/pressure from a supply, such as a hydraulic fluid reservoir and pump (not shown), to the hydraulic piston actuator. This sub-system and its operation will now be described in greater detail below.

Referring now to FIG. 2A and with continued reference to FIG. 1, a schematic diagram 200 of an example hydraulically controlled solenoid valve 204 connected to a hydraulic piston actuator 240 (a flow load) according to the principles of the present application is illustrated. The hydraulic solenoid valve 204 includes a valve body 208 defining an orifice or pathway 212 therethrough and a hydraulic fluid source or supply system 216, which is typically high or pressurized hydraulic fluid provided by a reservoir/pump system. The pathway 212 through the valve body 208 is selectively restricted or controlled by a valve device 220 having its position controlled by actuation of an electromagnetic solenoid 224. The output of the hydraulic solenoid valve 204 is provided to the hydraulic piston actuator 240 that is configured to selective engage/disengage a friction member 244, such as a clutch of hydraulic implementations of the automatic transmission system 120 or the braking system 124. The hydraulic piston actuator 240 includes an actuator body 248 having a hydraulic fluid chamber 252 that is a flow load and receives the pressurized hydraulic fluid via the hydraulic solenoid valve 204. The pressure of hydraulic fluid in the chamber 252 laterally displaces spring-loaded actuator, comprising a piston member 256 and a return spring 260, to control engagement/disengagement of the friction member 244.

Figure 2B:
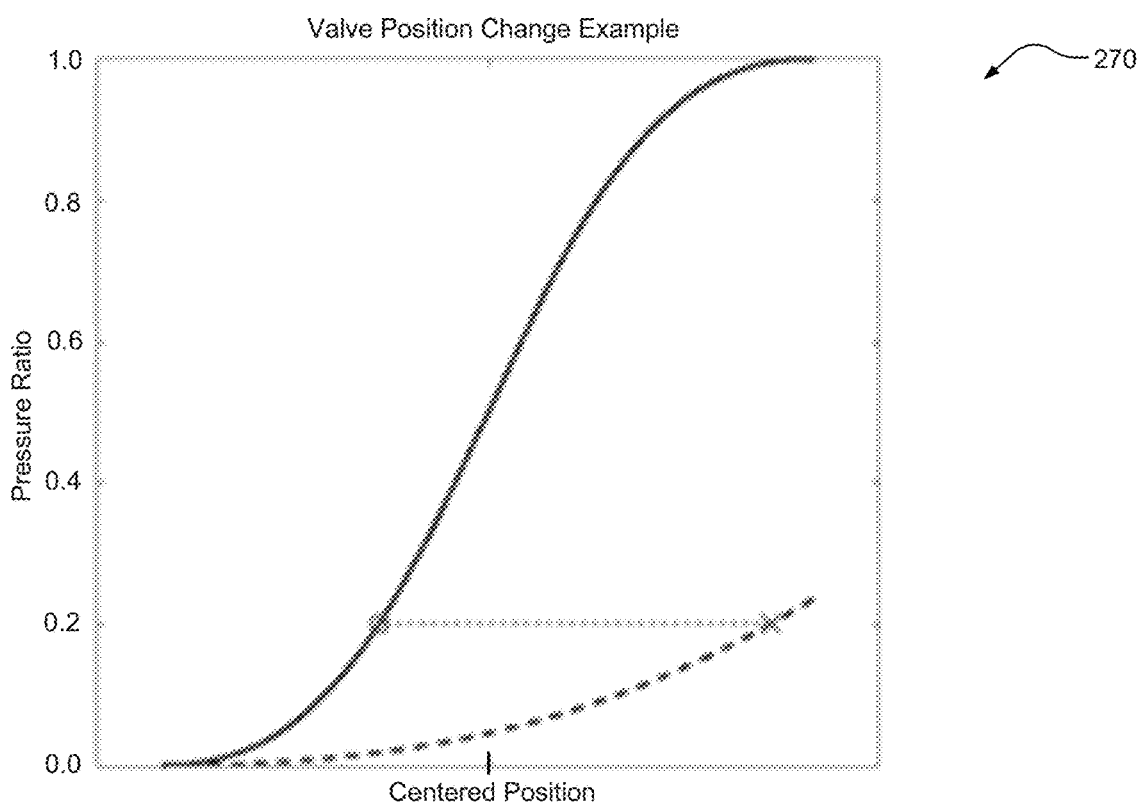
FIG. 2B is an example plot of a ratio of solenoid output pressure and hydraulic supply pressure as functions of valve position according to the principles of the present application.

Referring now to FIG. 2B and with continued reference to FIG. 1 and FIG. 2A, an example plot of a ratio of solenoid output pressure and hydraulic supply pressure as functions of valve position according to the principles of the present application. More specifically, the pressure ratio (the y-axis) represents a ratio of (i) the output pressure of the hydraulic solenoid valve 204 to (ii) the hydraulic supply pressure at the hydraulic fluid supply 216 or source/input side of the hydraulic solenoid valve 204. The left (non-dashed) curve illustrates the normal operation of the hydraulic solenoid valve 204 relative to the valve member position. As shown in FIG. 2B, when the piston member 256 of the hydraulic piston actuator 240 moves quickly enough, the hydraulic solenoid valve 204 cannot regulate its own output pressure. Instead, the output pressure of the hydraulic solenoid valve 204 will be controlled by the flow rate and pressure of the hydraulic piston actuator 240. In other words, a high pressure command to the hydraulic solenoid valve will not be achievable as shown in the right (dashed) curve and will result in the position of the valve member 220 going to an extreme, either one end or the other.

Figure 3A:
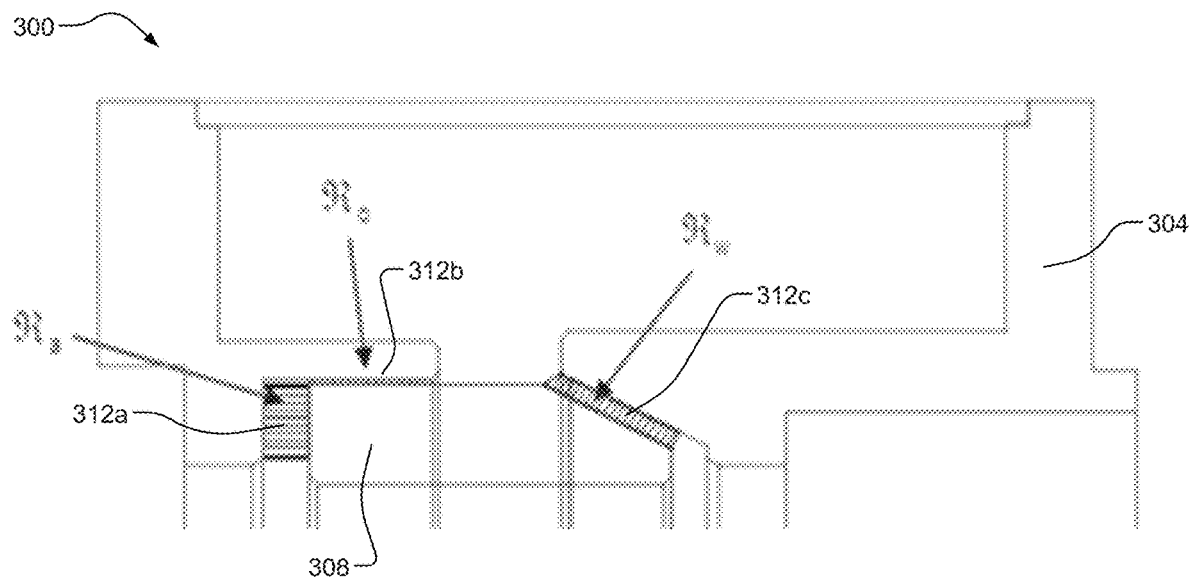
FIG. 3A is a side or cross-sectional diagram of an example hydraulically controlled solenoid having a moving armature and three air gap geometries according to the principles of the present application.

Referring now to FIG. 3A and with continued reference to FIG. 1 and FIGS. 2A-2B, a side or cross-sectional diagram of an example hydraulically controlled solenoid valve 300 having a valve body 304 and a moving armature 308 and three air gap geometries 312a, 312b, and 312c (collectively, "air gaps 312" or "air gap geometries 312") according to the principles of the present application is illustrated. It will be appreciated that this diagram is merely an example to illustrate air gap geometries 312 and is not designed for production or drawn to scale. In one exemplary implementation, the hydraulic solenoid valve 304 and its moving armature 308 correspond to the hydraulic solenoid valve 204 and valve member 220 of FIG. 2A. During pressure regulation, output pressure ($P_{SOL}$) of the hydraulic solenoid valve 204, 304 is a function of the position of the internal valve member 220, 308 that creates an orifice $A_{IN}$ between input (supply) pressure ($P_{SUPPLY}$) and the output (regulated) pressure, and $A_{OUT}$ between output (regulated) pressure and exhaust or vented pressure. Assuming negligible exhaust/vented pressure, the resulting outlet (regulated) pressure for a given valve inlet/outlet orifice combination for the hydraulic solenoid valve 204, 304 is:

$$p_{SOL} = \frac{A_{IN}^2}{A_{IN}^2 + A_{OUT}^2} \cdot p_{SUPPLY}, \tag{1}$$

where:

$$p_{SOL} = p + \left( \frac{Q}{C_d \cdot A_\phi \cdot \sqrt{\frac{2}{\rho}}} \right)^2, \tag{2}$$

where $\rho$ is the pressure in the chamber 252, Q is the flow rate, $A_\phi$ is the orifice diameter/area, $\rho$ is the specific gravity, and assuming a sharp edged orifice in turbulent flow (flow coefficient $C_d$~0.62).

Figure 3B:
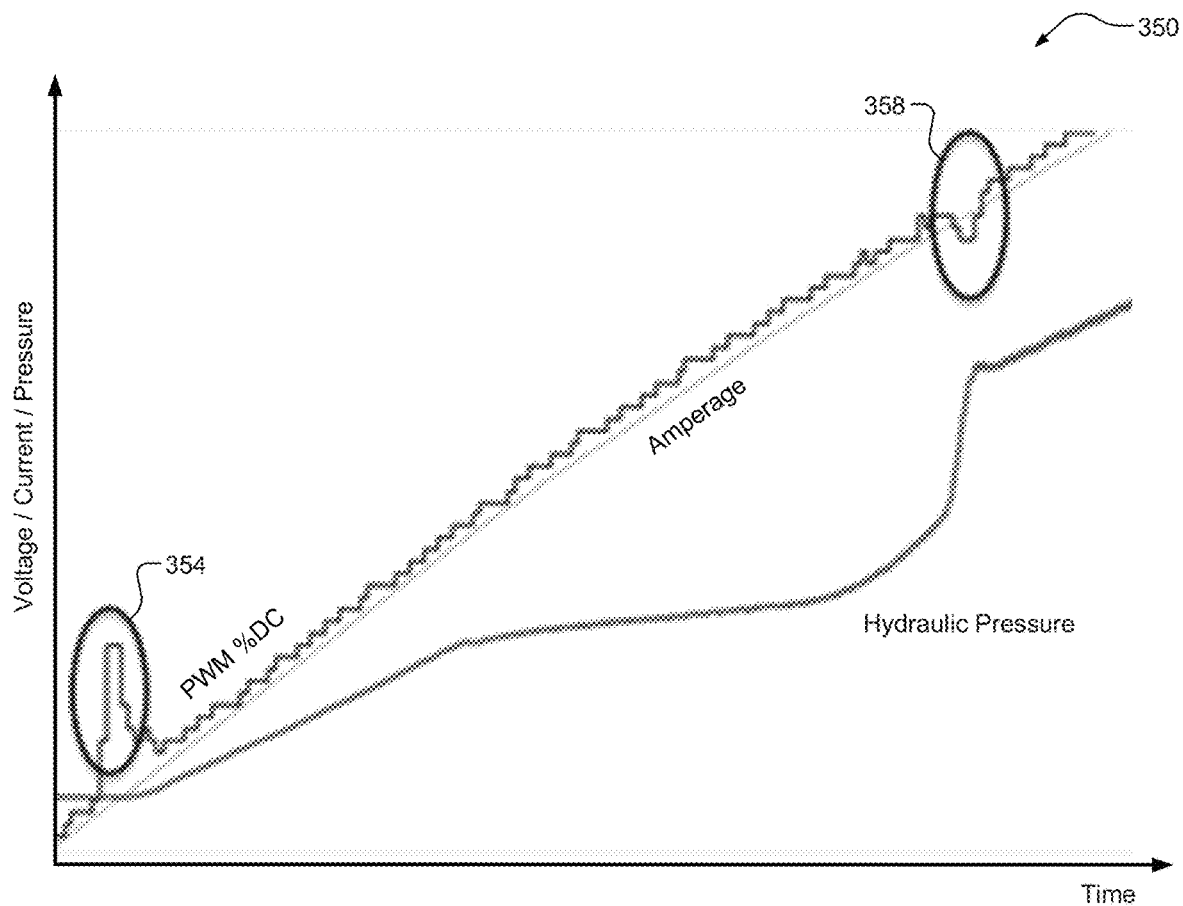
FIG. 3B is an example plot of an applied voltage (or duty cycle) to maintain a desired current during a commanded ramp in solenoid pressure according to the principles of the present application.

Referring now to FIG. 3B and with continued reference to FIGS. 1, 2A-2B, and 3A, an example plot 350 of an actual applied voltage (or duty cycle, "PWM % DC") to maintain a desired current ("Amperage") during a commanded ramp in hydraulic solenoid valve output pressure ("Hydraulic Pressure") relative to time according to the principles of the present application is illustrated. As shown, the actual pulse-width modulated (PWM) duty cycle tracks or maintains the desired current, with the exception of two excursions 354, 358. So, to maintain a given amperage during solenoid motion, the applied voltage (or PWM duty cycle) will have to change during valve motion. The plot 350 of FIG. 3B illustrates this effect during a commanded ramp in solenoid pressure. These excursions 354, 358 appear as spikes in the actual PWM duty cycle due to the above-described dynamics of the hydraulic solenoid valve 204, 304 and the hydraulic piston actuator 240. These excursions 354, 358 could be detected, for example, by determining when the actual PWM duty cycle exceeds an expected (steady-state) PWM duty cycle by more than a threshold amount (an excursion threshold). This excursion threshold and the steady-state duty cycle could be predetermined or calibrated based on testing data and could vary depending on the particular system design.

When detected, the voltage or PWM duty cycle change can be utilized to determine a magnetic reluctance change, which in turn can be used to determine or estimate the position or the hydraulic piston actuator 240. More specifically, air gap geometry influences magnetic reluctance ($R_m$), since reluctance is related to magnetic element length (x), and the inverse of the magnetic element area (A) and with a permeability ($\mu$):

$$R_m = \frac{x}{\mu \cdot A}, \tag{3}$$

For each of the three air gaps shown, one or both of the geometric properties in reluctance will change between the two hydraulic operation positions described above. Electromagnetic inductance (L) is related to the magnetic reluctance $R_m$ and increases with a number of electromagnetic coils (#) in the solenoid 224 (L=#/$R_m$). Solenoid voltage (V) is a function of the inductance L over time (t):

$$V(t) = L \cdot \frac{di}{dt} + R \cdot i + \frac{1}{C} \int (i) dT, \tag{4}$$

where i represents instantaneous current and R and C represent resistance and capacitance, respectively.

Figure 4:
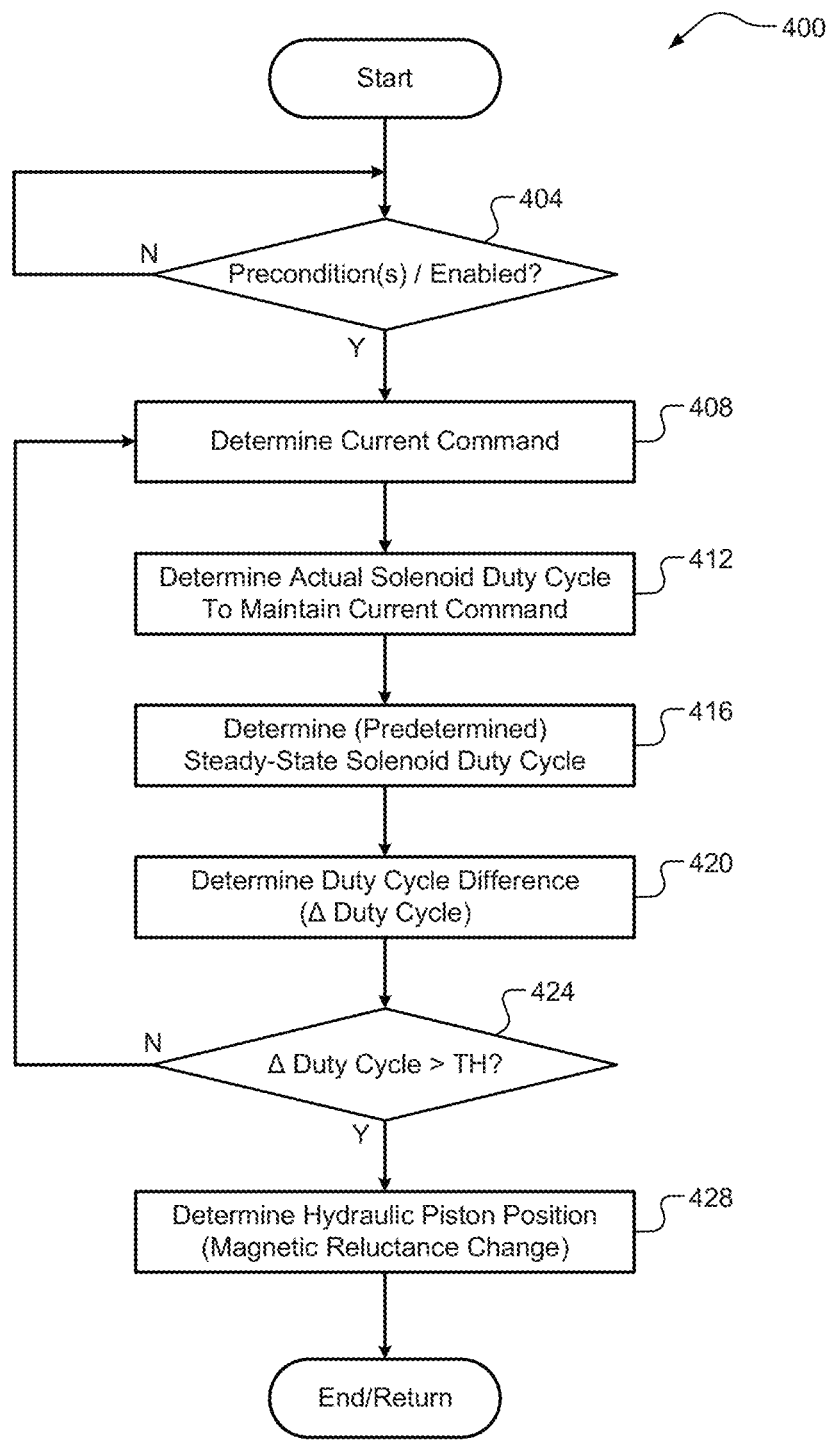
FIG. 4 is a flow diagram of an example hydraulic piston position determination method for a vehicle according to the principles of the present application.

Referring now to FIG. 4, a flow diagram of an example hydraulic piston position determination method 400 for a vehicle according to the principles of the present application is illustrated. While the vehicle 100 of FIG. 1 and components of FIGS. 2A-2B and 3A-3B are specifically referenced for illustrative/descriptive purposes, it will be appreciated that the method 400 could be applicable to any suitable vehicle, as well as to non-vehicle hydraulically actuated or controlled systems. At 404, the controller 128 determines whether a set of one or more preconditions are satisfied. These precondition(s) could include, for example, the hydraulic position determination method being enabled (e.g., an enabled signal having been generated) and there being no malfunctions or faults present that would otherwise affect the operation of the method 400. When false, the method 400 ends or returns to 404. When true, the method 400 continues to 408 where the controller 128 determines a current command for the hydraulic solenoid valve 204, 304. This current command, for example, could be based on other operating parameters and could be to command engagement or disengagement of the clutch member 244 as desired. At 412, the controller 128 determines the actual solenoid voltage (PWM % DC) for the hydraulic solenoid valve 204, 304 to maintain the current command. At 416, the controller 128 determines a steady-state solenoid voltage (PWM % DC) for the hydraulic solenoid valve 204, 304.

As previously mentioned, this steady-state voltage or PWM duty cycle could be predetermined or calibrated based on previously performed testing. For example, this information could be stored in a look-up table that is stored in a memory of the controller 128 and accessed to obtain the steady-state voltage or PWM duty cycle. The look-up table, for example, could include various voltages or PWM duty cycles relating to various current commands and could, in some implementations, be further based on other parameters such as operating/ambient temperature. At 420, the controller 128 determines a difference (A Duty Cycle) between the actual and steady-state PWM duty cycles for the hydraulic solenoid valve 204, 304. At 424, the controller 128 determines whether this difference A Duty Cycle is greater than an excursion threshold (TH). As previously discussed, this excursion threshold TH could be predetermined or calibrated based on previous testing data. When true (e.g., when in one of the excursion regions 354, 358 of FIG. 3B), the method 400 proceeds to 429 where hydraulic piston position determination can occur. Otherwise, the method 400 ends or returns to 408. At 428, the controller 128 determines the hydraulic piston position (of the hydraulic piston actuator 240) based on a change in voltage/duty cycle, which corresponds to a change in magnetic reluctance $R_m$ and via the relationships previously described herein, is used to determine the position of the hydraulic piston actuator 240, which could then be utilized for other purposes (controls, diagnostics, functional safety tests, etc.). The method 400 then ends.

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A hydraulic piston position determination system for a vehicle, the hydraulic piston position determination system comprising:
   a hydraulic piston actuator configured to move a piston member in response to a hydraulic fluid pressure to engage/disengage a friction member of the vehicle;
   a hydraulic solenoid valve configured to control the hydraulic fluid pressure at the hydraulic piston actuator by regulating a flow of hydraulic fluid from a hydraulic fluid supply system; and
   a controller configured to:
      control the hydraulic piston actuator by controlling the hydraulic solenoid valve according to an actual duty cycle based on a flow demand change associated with the hydraulic piston actuator; and
      determine a position of the hydraulic piston actuator based on (i) a magnetic reluctance change and (ii) a difference between the actual duty cycle and a steady-state duty cycle for the hydraulic solenoid valve.

2. The hydraulic piston position determination system of claim 1, wherein the controller is configured to determine the position of the hydraulic piston actuator in a non-intrusive manner.

3. The hydraulic piston position determination system of claim 2, wherein the controller does not intrusively command a torque change at the vehicle and then determine the position of the hydraulic piston actuator based on a detected change in a rotational speed of a component of the vehicle.

4. The hydraulic piston position determination system of claim 1, wherein the controller is further configured to:
   determine a current demand for the hydraulic solenoid valve based on the flow demand change associated with the hydraulic piston actuator;
   determine the steady-state duty cycle for the hydraulic solenoid valve based on the determined current demand;
   determine the actual duty cycle for the hydraulic solenoid valve that maintains the current demand during motion of the hydraulic solenoid valve; and
   determine the position of the hydraulic piston actuator based on the actual duty cycle a set of known parameters when the difference between the actual and steady-state duty cycles for the hydraulic solenoid valve exceeds an excursion threshold.

5. The hydraulic piston position determination system of claim 4, wherein the set of known parameters include, for the hydraulic solenoid valve, voltage, electromagnetic inductance, electromagnetic coil quantity, and air gap geometry, and wherein changes in the air gap geometry affect the magnetic reluctance.

6. The hydraulic piston position determination system of claim 4, wherein the controller is configured to use a predetermined lookup table relating various steady-state duty cycles and current demands to determine the steady-state duty cycle for the hydraulic solenoid valve based on the determined current demand.

7. The hydraulic piston position determination system of claim 1, wherein the friction member is a clutch member of an automatic transmission system of the vehicle.

8. The hydraulic piston position determination system of claim 1, wherein the friction member is a clutch member of a hydraulic braking system of the vehicle.

9. A hydraulic piston position determination method for a vehicle, the method comprising:
   providing a hydraulic piston actuator configured to move a piston member in response to a hydraulic fluid pressure to engage/disengage a friction member of the vehicle;
   providing a hydraulic solenoid valve configured to control the hydraulic fluid pressure at the hydraulic piston actuator by regulating a flow of hydraulic fluid from a hydraulic fluid supply system;

controlling, by a controller, the hydraulic piston actuator by controlling the hydraulic solenoid valve according to an actual duty cycle based on a flow demand change associated with the hydraulic piston actuator; and determining, by the controller, a position of the hydraulic piston actuator based on (i) a magnetic reluctance change and (ii) a difference between the actual duty cycle and a steady-state duty cycle for the hydraulic solenoid valve.

10. The hydraulic piston position determination method of claim 9, wherein the determining of the position of the hydraulic piston actuator is performed in a non-intrusive manner.

11. The hydraulic piston position determination method of claim 10, wherein the controller does not intrusively command a torque change at the vehicle and then determine the position of the hydraulic piston actuator based on a detected change in a rotational speed of a component of the vehicle.

12. The hydraulic piston position determination method of claim 9, further comprising:

determining, by the controller, a current demand for the hydraulic solenoid valve based on the flow demand change associated with the hydraulic piston actuator;

determining, by the controller, the steady-state duty cycle for the hydraulic solenoid valve based on the determined current demand;

determining, by the controller, the actual duty cycle for the hydraulic solenoid valve that maintains the current demand during motion of the hydraulic solenoid valve; and determining, by the controller, the position of the hydraulic piston actuator based on the actual duty cycle a set of known parameters when the difference between the actual and steady-state duty cycles for the hydraulic solenoid valve exceeds an excursion threshold.

13. The hydraulic piston position determination method of claim 12, wherein the set of known parameters include, for the hydraulic solenoid valve, voltage, electromagnetic inductance, electromagnetic coil quantity, and air gap geometry, and wherein changes in the air gap geometry affect the magnetic reluctance.

14. The hydraulic piston position determination method of claim 12, wherein determining the steady-state duty cycle for the hydraulic solenoid valve based on the determined current command includes using a predetermined lookup table relating various steady-state duty cycles and current demands.

15. The hydraulic piston position determination method of claim 9, wherein the friction member is a clutch member of an automatic transmission system of the vehicle.

16. The hydraulic piston position determination method of claim 9, wherein the friction member is a clutch member of a hydraulic braking system of the vehicle.

* * * * *